(12) United States Patent
Curtis et al.

(10) Patent No.: US 11,128,518 B2
(45) Date of Patent: Sep. 21, 2021

(54) SYSTEMS AND METHODS FOR SIDELINE PROCESSING IN A VIRTUAL NETWORK FUNCTION

(71) Applicant: Ciena Corporation, Hanover, MD (US)

(72) Inventors: Paul Curtis, Alpharetta, GA (US); Marc Holness, Ottawa (CA); Hossein Baheri, San Jose, CA (US); Ankit Sood, San Jose, CA (US); Pramod Kumar Aggarwal, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 399 days.

(21) Appl. No.: 16/048,850

(22) Filed: Jul. 30, 2018

(65) Prior Publication Data

US 2020/0036570 A1 Jan. 30, 2020

(51) Int. Cl.
*H04L 12/24* (2006.01)

(52) U.S. Cl.
CPC ................ *H04L 41/04* (2013.01)

(58) Field of Classification Search
USPC ............................................. 709/223
See application file for complete search history.

(56) References Cited

U.S. PATENT DOCUMENTS

| 2014/0133289 | A1* | 5/2014 | Jadav | H04L 41/0672 370/216 |
| 2016/0182340 | A1* | 6/2016 | Robitaille | H04L 45/586 370/241.1 |
| 2016/0205004 | A1* | 7/2016 | Chou | H04L 41/0896 709/224 |
| 2016/0232048 | A1* | 8/2016 | Treves | H04L 43/026 |
| 2017/0097842 | A1* | 4/2017 | Bugenhagen | G06F 9/45558 |
| 2017/0257276 | A1* | 9/2017 | Chou | H04W 24/02 |
| 2018/0205004 | A1* | 7/2018 | Park | H01F 10/3286 |

* cited by examiner

*Primary Examiner* — Hermon Asres
(74) *Attorney, Agent, or Firm* — Clements Bernard Walker; Lawrence A. Baratta, Jr.; Christopher L. Bernard (57) ABSTRACT

A Virtual Network Function (VNF) executed on a processing device includes one or more first Terminal Access Point (TAP) interfaces which are virtual network kernel interfaces and which are each mapped to an associated second TAP interface associated with a Network Operating System (NOS), wherein the associated second TAP interface is mapped to an associated physical port; and a processor configured to receive, transmit, and process select frames via the one or more first TAP interfaces, wherein the VNF is in a sideline configuration of a service flow, only receiving and transmitting the select frames of the service flow.

17 Claims, 5 Drawing Sheets

SYSTEMS AND METHODS FOR SIDELINE PROCESSING IN A VIRTUAL NETWORK FUNCTION

FIELD OF THE DISCLOSURE

The present disclosure generally relates to networking systems and methods. More particularly, the present disclosure relates to systems and methods for sideline processing in a Virtual Network Function (VNF) such as a virtual Operations, Administration, and Maintenance (vOAM) VNF.

BACKGROUND OF THE DISCLOSURE

Network Functions Virtualization (NFV) is a network architecture concept that uses virtualization to transform entire classes of network node functions into building blocks that may connect, or chain together, to create network services. A Virtualized Network Function (VNF) may include one or more Virtual Machines (VMs) running different software and processes or software containers, on top of standard high-volume servers, switches, and storage, or even cloud computing infrastructure, instead of having custom hardware appliances for each network function. For example, a virtual session border controller could be deployed to protect a network without the typical cost and complexity of obtaining and installing physical units. Other examples of NFV include virtualized load balancers, firewalls, Domain Name Servers (DNS), intrusion detection devices and Wide Area Network (WAN) accelerators. The NFV framework can be conceptualized with three components generally, namely VNFs, Network Functions Virtualization Infrastructure (NFVI), and Network Functions Virtualization Management and Orchestration Architectural framework (NFV-MANO). Again, VNFs are software implementations of network functions that can be deployed on the NFVI. The NFVI is the totality of all hardware and software components that build the environment where VNFs are deployed. The NFVI can span several locations and the network providing connectivity between these locations is considered as part of the NFVI. The NFV-MANO is the collection of all functional blocks, data repositories used by these blocks, and reference points and interfaces through which these functional blocks exchange information for the purpose of managing and orchestrating NFVI and VNFs.

Ethernet Operations, Administration, and Maintenance (OAM) is used for network management to determine operational parameters of an Ethernet network. Ethernet OAM includes transmission and reception of OAM Protocol Data Units (PDUs) for continuity checks, link trace, loopback, alarm indication, remote defect indication, automatic protection switching, frame loss measurement, frame delay measurement, and the like. Example specifications related to Ethernet OAM include IEEE 802.1ag Connectivity Fault Management (CFM) (2007) and G.8013/Y.1731 "OAM functions and mechanisms for Ethernet based networks" (August 2015), the contents of each are incorporated by reference herein.

Existing VNFs operate in a service flow in an inline manner (e.g., in a Service Function Chain (SFC)) where each VNF receive, process, and transmit all frames in the service flow. Specifically, there are existing virtual OAM (vOAM) VNFs which are configured to source, process, and analyze OAM PDUs in this inline manner. The inline manner includes the existing vOAM being placed in a service flow where it receives all frames in the service flow, processes select OAM PDUs, and inserts the OAM PDUs directly into the service flow. However, there are disadvantages with the inline manner, including scale, latency, and limited deployment. For scale, the existing vOAM has to process every packet in the service flow while OAM PDUs may be a small subset. For latency, since the existing vOAM is a part of service flow, each VNF's processing adds delay in an OAM PDU's reception and transmission which in-turn affects the performance of the OAM functionality. For example, OAM faults may take more time to be declared and propagated to peers. For limited deployment, because of scale, the existing vOAM is difficult to deploy with so-called white box solutions (commoditized hardware) since the existing vOAM is expensive from a processing perspective.

BRIEF SUMMARY OF THE DISCLOSURE

In an embodiment, a Virtual Network Function (VNF) executed on a processing device includes one or more first Terminal Access Point (TAP) interfaces which are virtual network kernel interfaces and which are each mapped to an associated second TAP interface associated with a Network Operating System (NOS), wherein the associated second TAP interface is mapped to an associated physical port; and a processor configured to receive, transmit, and process select frames via the one or more first TAP interfaces, wherein the VNF is in a sideline configuration of a service flow, only receiving and transmitting the select frames of the service flow. The NOS can be configured to deliver the select frames from the associated physical port to the associated second TAP interface and to an associated first TAP interface with all service tags. The VNF can be a virtualized Operations, Administration, and Maintenance (vOAM) VNF, and wherein the processor can be further configured to uniquely identify a Maintenance End Point (MEP) associated with an OAM frame based on a plurality of factors. The plurality of factors can include service tags, the associated physical port, and a Maintenance Domain (MD) from the select frame. The processor can be further configured to implement a logical interface for each of the one or more first TAP interfaces which indirectly maps the one or more first TAP interfaces with physical ports in the NOS. The NOS can be configured to select the select frames from data frames in the service flow based on one or more of EtherType, OpCode, and Media Access Control (MAC) Destination Address (DA). The VNF can be a virtualized Operations, Administration, and Maintenance (vOAM) VNF, and wherein the select frames can be compliant to one of IEEE 802.1ag, G.8013/Y.1731.

In another embodiment, a Virtual Network Function (VNF) system includes a sideline VNF executed on a processing device; and a Network Operating System (NOS) communicatively coupled to one or more VNFs and to the sideline VNF; wherein a service flow is configured via the NOS through the one or more VNFs, wherein the service flow includes data frames and select frames, and wherein the NOS is configured to segment only the select frames with the sideline VNF in a sideline configuration such that the sideline VNF only receives and transmits the select frames. The sideline VNF can include one or more first Terminal Access Point (TAP) interfaces which are virtual network kernel interfaces, wherein the NOS can include one or more second TAP interfaces which are 1:1 mapped with the one or more first TAP interfaces and one or more physical ports which are 1:1 mapped with the one or more second TAP interfaces. The NOS can be configured to deliver the select frames from an associated physical port to the sideline VNF via associated Terminal Access Point (TAP) interfaces with all service tags. The sideline VNF can be a virtualized Operations, Administration, and Maintenance (vOAM) VNF, and wherein a Maintenance End Point (MEP) associated with an OAM frame can be uniquely identifier based on a plurality of factors. The plurality of factors can include service tags, the associated physical port, and a Maintenance Domain (MD) from the OAM frame. The NOS can be configured to select the OAM frames from data frames in the service flow based on one or more of EtherType, OpCode, and Media Access Control (MAC) Destination Address (DA). The sideline VNF can be a virtualized Operations, Administration, and Maintenance (vOAM) VNF, and wherein the OAM frames can be compliant to one of IEEE 802.1ag, G.8013/Y.1731.

In a further embodiment, a Virtual Network Function (VNF) method includes operating one or more first Terminal Access Point (TAP) interfaces which are virtual network kernel interfaces and which are each mapped to an associated second TAP interface associated with a Network Operating System (NOS), wherein the associated second TAP interface is mapped to an associated physical port; and receiving, transmitting, and processing select frames via the one or more first TAP interfaces, wherein the VNF is in a sideline configuration of a service flow, only receiving and transmitting the select frames. The NOS can be configured to deliver the select frames from the associated physical port to the associated second TAP interface and to an associated first TAP interface with all service tags. The VNF can be a virtualized Operations, Administration, and Maintenance (vOAM) VNF, and the method can further include uniquely identifying a Maintenance End Point (MEP) associated with the select frame based on a plurality of factors. The plurality of factors can include service tags, the associated physical port, and a Maintenance Domain (MD) from the OAM frame. The VNF method can further include implementing a logical interface for each of the one or more first TAP interfaces which indirectly maps the one or more first TAP interfaces with physical ports in the NOS. The NOS can be configured to segment the select frames from data frames in the service flow based on one or more of EtherType, OpCode, and Media Access Control (MAC) Destination Address (DA).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for sideline processing in a Virtual Network Function (VNF) such as a virtual Operations, Administration, and Maintenance (vOAM). The vOAM VNF or other types of VNFs utilize a sideline configuration in contrast to typical inline configuration. The sideline configuration is such that the vOAM VNF, or the like, only processes OAM PDUs instead of all frames of a service. For example, the vOAM VNF, or the like, is an optimized, high performance, low latency and highly interoperable VNF for Connectivity Fault Management (CFM).

Advantageously, the vOAM VNF is highly interoperable with all types of Network Operating Systems (NOS), platforms such as white box implementations, Commercial Off The Shelf (COTS) servers, etc. The vOAM VNF reduces the need for standard protocols between the NOS and VNF for service mapping (e.g., defining metadata, Application Programming Interfaces (APIs), interfaces between the NOS and the VNF, etc.).

The vOAM VNF does not require the inline configuration in the service flow resulting in high performance and low latency (which are advantageous for white box deployments with hundreds of gigabits of traffic on each port). That is, the vOAM VNF does not need to process a large of a volume of traffic. The vOAM VNF requires the NOS to create Terminal Access Point (TAP) interfaces only for those physical ports on which service monitoring is required (and not all physical ports). This makes the vOAM VNF flexible and more efficient since it utilizes less resources. In a Linux virtualization environment, the TAP interfaces are special software entities that allow userspace programs and virtual machines to see raw network traffic (i.e., virtual network kernel interfaces). Virtual machines connect to these TAP interfaces for receiving and transmitting the raw Ethernet frames from the NOS. Further, the sideline configuration described herein can be used with other VNF types, including Bidirectional Forwarding Detection (BFD), control protocol VNFs, Open Shortest Path First (OSPF) VNFs, etc.

VNF

A VNF is a software implementation of a network function which is capable of running on a Network Function Virtualization Infrastructure (NFVI). The NFVI can be as specified in ETSI GS NFV-MAN 001 "Network Functions Virtualization (NFV); Management and Orchestration," V1.1.1 (2014-12), the contents of which are incorporated herein by reference. A VNF can be executed on a Virtual Machine (VM) or in a container. VMs are a way to allow multiple operating systems and applications to run on the same physical hardware. Containers are an emerging VNF option that allows more VNFs on a physical host since containers do not include their own operating systems, but rather use an underlying operating system.

Inline vOAM VNF

Figure 1:
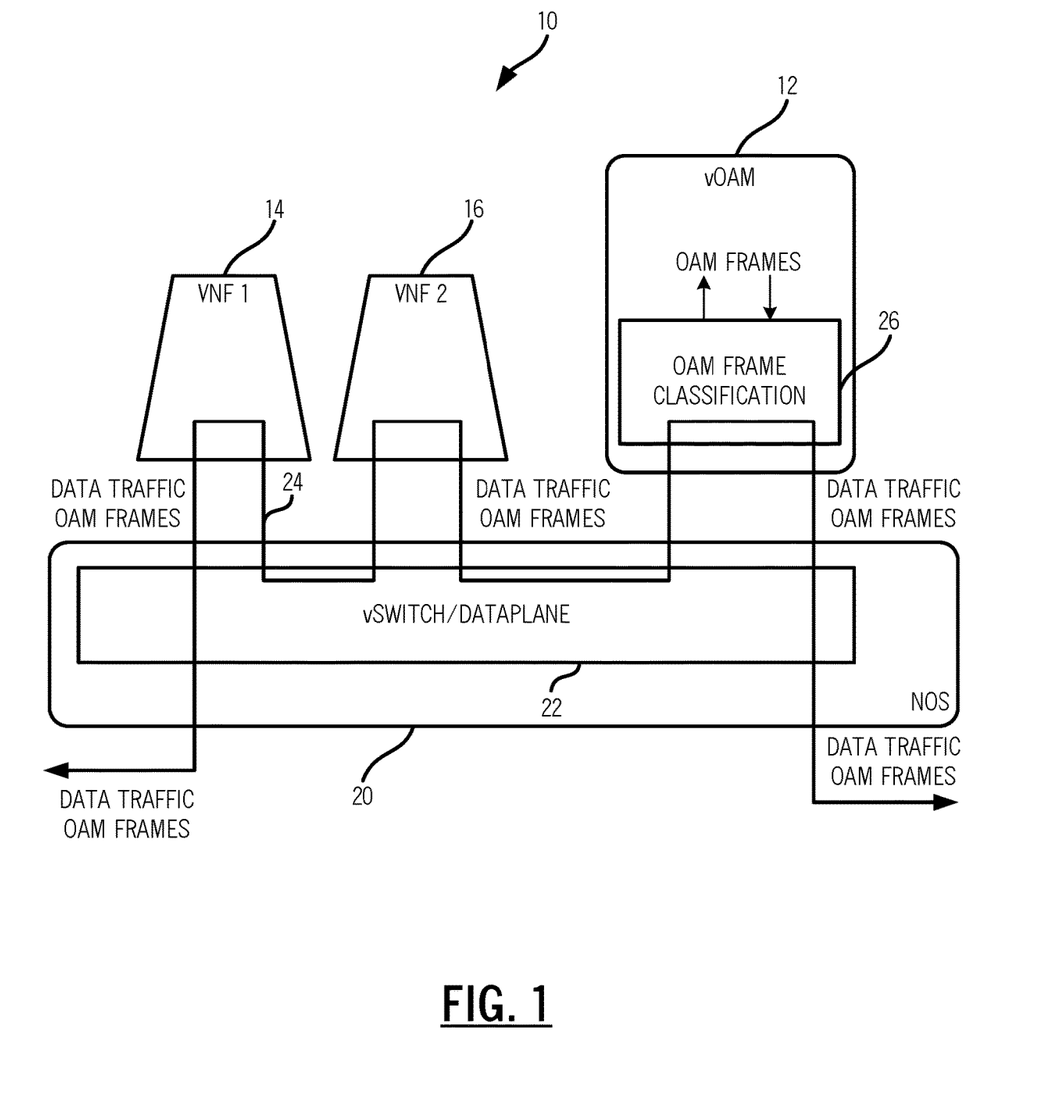
FIG. 1 is a network diagram of a service chain which includes a virtual OAM (vOAM) VNF in an inline configuration with two additional VNFs.

FIG. 1 is a network diagram of a service chain 10 which includes a virtual OAM (vOAM) VNF 12 in an inline configuration with two additional VNFs 14, 16. The VNFs 14, 16 are connected to a Network Operating System (NOS) 20 which has a virtual switch (vSwitch)/dataplane 22 (which could also be a VNF). Those skilled in the art will recognize this is merely an example implementation and other implementations are also contemplated. For example, the VNFs 14, 16 can be physical elements, the connections can be different, etc. Further, the vOAM VNF 12 contemplates interoperability with physical elements. Specifically, a use case can include using the vOAM VNF 12 with white box devices, COTS, third-party vendors, etc., allowing management interoperability. The VNFs 14, 16 can be any network function including, for example, intrusion prevention, firewall, load balancer, Wide Area Network (WAN) balancer, switch, router, web server, and the like.

The inline vOAM VNF 12 operates in an inline manner which means it is in a service flow 24. Generally, the inline vOAM VNF 12 performs the same functions a switch or router performs with respect to transmission, reception, and processing of OAM frames. The service flow 24 includes all frames in the service chain 10, namely data frames and OAM frames. Thus, the vOAM VNF 12 receives and process all the frames in the service flow 24. The vOAM VNF 12 includes an OAM frame classifier 26 which classifies and extracts OAM frames (which can also be referred to as OAM control PDUs or the like) for further special processing by the vOAM VNF 12 and lets the rest of data traffic in the service flow 24 pass through. The vOAM VNF 12 is further configured to directly inject OAM frames in the service flow 24.

OAM Frames

OAM frames are used to perform management functions. Again, OAM frames are defined, for example, in IEEE 802.1ag, G.8013/Y.1731, etc., the specifications of which are incorporated herein by reference. The OAM frames can be for continuity checks, link trace, loopback, alarm indication, remote defect indication, automatic protection switching, frame loss measurement, frame delay measurement, and the like. The OAM frame classifier 26 knows a priori by inspection which frames in the service flow 24 are OAM or not. The OAM frames can be a Continuity Check Message (CCMs), Loopback Messages (LBM), Loopback Reply (LBR), Link Trace Message (LTM), Link Trace Reply (LTR), Alarm Indication Signal (AIS), Automatic Protection Switching (APS), Remote Defect Indication (RDI), Delay Measurement Message (DMM), Delay Measurement Reply (DMR), Loss Measurement Message (LMM), Loss Measurement Reply (LMR), and the like. Those skilled in the art will recognize various other types of OAM frames are also contemplated. Of note, an OAM frame is identified a priori based on an Operational Code (OpCode), Maintenance End MEP Level, VLAN ID, service headers, or some other standardized indication in the OAM frame which enables the NOS 20 and the vSwitch/dataplane 22 to differentiate.

Sideline vOAM VNF

Figure 2:
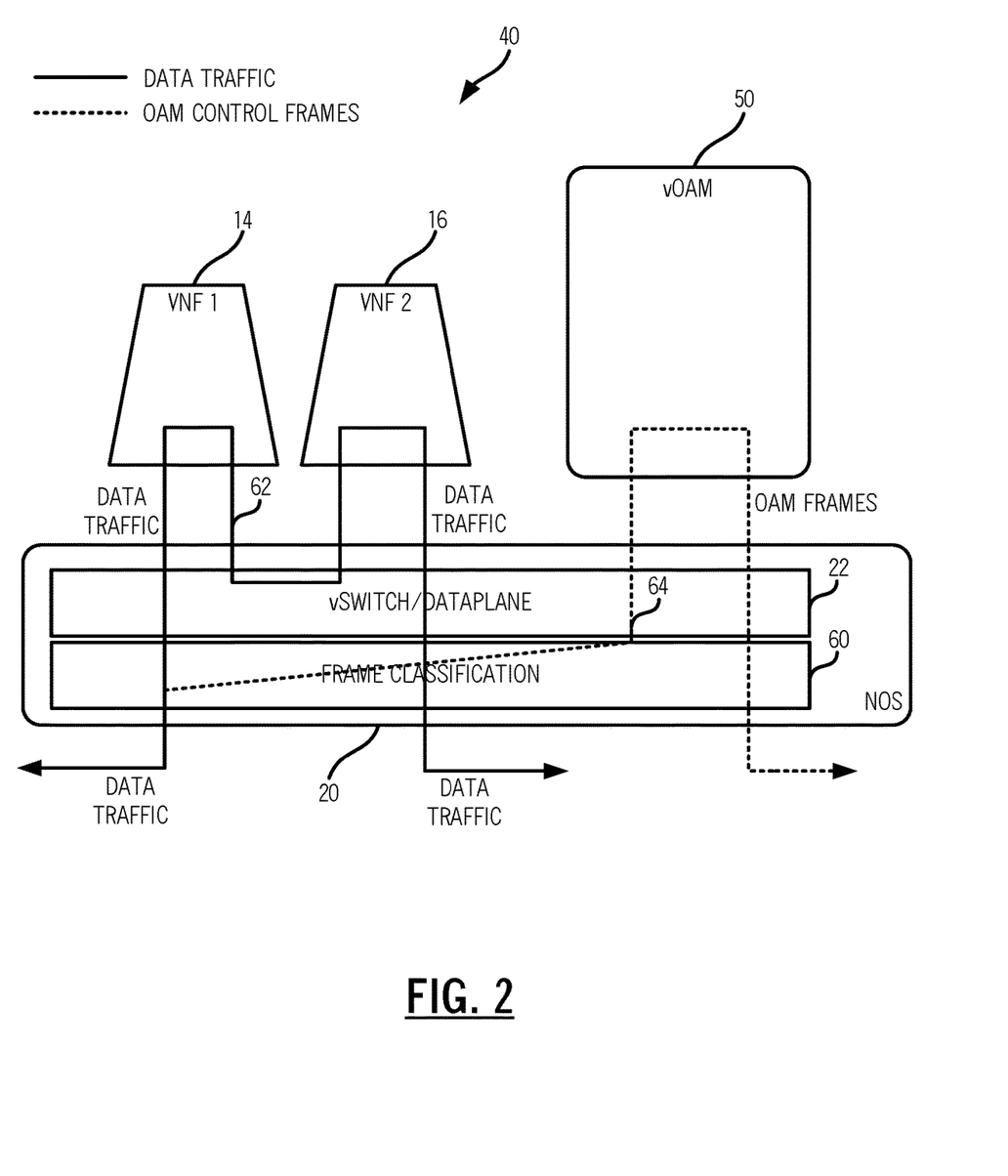
FIG. 2 is a network diagram of a service chain which includes a virtual OAM (vOAM) VNF in a sideline configuration with two additional VNFs.

FIG. 2 is a network diagram of a service chain 40 which includes a virtual OAM (vOAM) VNF 50 in a sideline configuration with two VNFs 14, 16. FIG. 2 has a similar network connectivity/configuration except the vOAM VNF 50 is in the sideline configuration. For example, the vOAM VNF 50 is an optimized, high performance, low latency and highly interoperable VNF (Virtual network function) for CFM (Connectivity Fault Management). Again, the VNFs 14, 16 can be any network function including, for example, intrusion prevention, firewall, load balancer, Wide Area Network (WAN) balancer, switch, router, web server, and the like.

The vOAM VNF 50 is a so-called sideline VNF or in a sideline configuration which means the vOAM VNF 50 is launched as a VNF that is not part of any service flow. Here, the NOS 20 can include a frame classification process 60 which can differentiate between data frames 62 and OAM frames 64. In such sideline configuration, only the OAM frames 64 are forwarded to the vOAM VNF 50 and not the data frames 62. Thus, the vOAM VNF 50 does not have to process the entire service flow, but rather only the OAM frames 64.

There is a "loose coupling" between the NOS 20 and the vOAM VNF 50, namely the vOAM VNF 50 does not require a direct interface with the NOS 20 to be aware of the service domain of the NOS 20. The vOAM VNF 50 can add service headers such as S-tags, C-tags, etc. to control frames and the NOS 20 can transmit such frames out from physical ports. This eliminates the need for the vOAM VNF 50 to have a dependency on the NOS 20 to inject a control frame into the service flow.

The vOAM VNF 50 can classify a received frame to a unique MEP (Maintenance End Point) based on the received frame's S-tag (service tag) and the logical interface of vOAM VNF 50 on which it is received. This would reduce the need for vOAM VNF 50 to have a dependency on the NOS 20 to provide service information for classifying a frame to a unique MEP, allowing the vOAM VNF 50 to work with various implementations of the NOS 20.

Since the vOAM VNF 50 is not a part of any service chain, it will not receive all data traffic 62. The vOAM VNF 50 only receives the OAM frames 64 and therefore consumes fewer processor cycles in frame processing. On a white box, this is more important because with multiple 100G interfaces on the white box, it will be highly inefficient for the vOAM VNF 50 to process all the data traffic 62.

The vOAM VNF 50 can be deployed on COTS servers, white box, and any OAM unaware NOS Platforms with following capabilities supporting VNFs, capability to classify Ethernet frames based on any segment of a frame (like Ether-type, OpCode, etc.), capability to deliver a frame with all the tags to VNFs, capability to transmit frames received from VNFs out on the physical ports, and the like.

There is a vOAM TAP interface which is mapped to a NOS TAP interface, i.e., a 1:1 mapping. Again, in a Linux virtualization environment, TAP (Terminal Access Point) Interfaces are special software entities that allow userspace programs and virtual machines to inspect raw network traffic. Virtual machines connect to these TAP interfaces for receiving and transmitting the raw Ethernet frames from the NOS 20.

The NOS 20 is configured with the ability to deliver OAM frames 64 with all tags from the physical ports to the vOAM VNF 50 and to deliver OAM frames 64 from the vOAM VNF 50 to the physical ports. The NOS 20 further includes the frame classification process 60 to classify the data frames 62 and the OAM frames 64 based on any segment of the frame such as Ether-type, OpCode, etc.

The vOAM VNF 50 is deployed as a standalone VM or container and not configured to be a part any service flow. The NOS 20 is configured to classify frames using the frame classification process 60 based on any segment in a frame (like Ether-type, OpCode, etc.). The frame classification process 60 can be a standard packet filter that can be applied in the ingress pipeline of the packet processor of the NOS 20. This helps in classification of the OAM frames 64 at the NOS 20 itself rather than at the vOAM VNF 50 thereby reducing the load at the vOAM VNF 50. This is illustrated in FIG. 2 where ingress data traffic is split into two streams—the solid lines indicate the data traffic flow and the dotted lines indicate the OAM frame 64 flow. This stream is split in the frame classification process 60.

Again, the vOAM VNF 50 does not receive any regular data traffic for processing, and thus results in its better performance. Also, the OAM frames 64 do not traverse through any other VNF, reducing latency in the OAM frame 64 input/output (IO). For certainty, for implementations wherein OAM frames 64 do not traverse any other VNFs, the vOAM 50 proposed herein may include some packet processing previously provided by VNFs 14, 16 as such processing applies to OAM frames 64, for example intrusion detection, firewall, etc. Conversely, regular data traffic does not traverse the vOAM 50 reducing latency for content. In accordance with the systems and methods, the OAM frames 64 do not traverse the VNF service chain 40, reducing OAM frame processing latency.

Also, there can be multiple vOAMs 50 and each can be configured to monitor different paths, e.g., a working path and a protection path. For example, the vOAM 50 can be viewed as a MEP per path.

As explained herein, the vOAM VNF 50 provides benefits over the inline vOAM VNF 12 by providing a high performance, low latency, and scalable OAM solution by deploying it a sideline configuration thereby considerably reducing the frames received in VNF to only OAM PDUs and not data traffic.

The transmission and reception of the OAM frames 64 are performed as follows. In order to identify the MEPs associated with received OAM frames 64, the vOAM VNF 50 needs to know the received interface and service tags. One approach could be to include these as a part of ingress frame's metadata but that requires an interface between the vOAM VNF 50 and the NOS 20 making this less interoperable on all platforms and types of NOS. Similarly, for OAM frame transmission, if the vOAM VNF 50 requires NOS services for adding service tags, it makes the vOAM VNF 50 less interoperable on all platforms and types of NOS.

Figure 3:
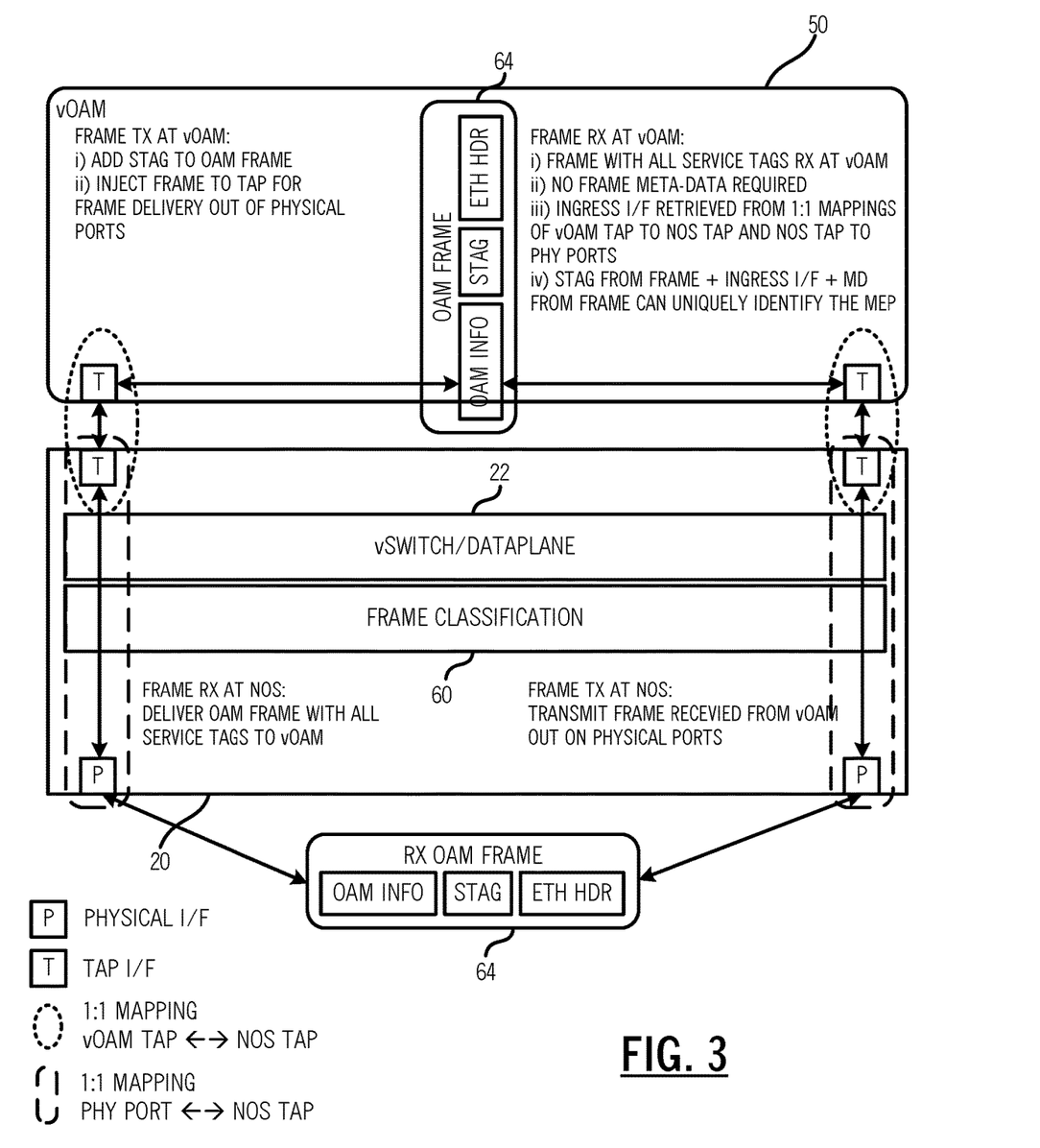
FIG. 3 is a block diagram of details of the sideline configuration between the vOAM VNF and a Network Operating System (NOS)

A preferred approach without any interdependency with the NOS 20 (for packet metadata, etc.) is to use the TAP interfaces. FIG. 3 is a block diagram of details of the sideline configuration between the vOAM VNF 50 and the NOS 20. The NOS 20 creates TAP interfaces (indicated by the box with "T") corresponding to the number of physical ports (indicated by the box with "P"), for example, with a 1:1 mapping between them (indicated by long dashes). In one implementation, the vOAM VNF 50 creates a TAP interface for each NOS TAP interface with 1:1 mapping between them (indicated by short dashes).

The vOAM VNF 50 creates a "logical interface" for the vOAM TAP interface and that logical interface provides an indirect mapping with the physical ports. Any frame received on a physical port would be analogous to a frame received on a logical interface for the vOAM VNF 50. The vOAM VNF 50 uses these logical interfaces for their configurations (MEP creation, etc.) and they help to identify the ingress/egress interfaces for the OAM frame IO (Input/Output).

In order to reduce service mapping dependency between the NOS 20 and vOAM VNF 50, the NOS 20 is configured to deliver ingress OAM frames 64 with all service tags to vOAM VNF 50. The Service tag (S-tag) in ingress frame is used to classify a frame to a unique MEP. The vOAM VNF 50 adds the service tags based on its own configuration and injects the frame to the NOS 20. The NOS 20 ensures that the frame is transmitted out from the physical port(s) with the correct tags.

The vOAM VNF 50 is configured to receive an OAM frame 64 from the NOS 20 and an associated TAP interface with all S-tags, such that there is no frame metadata required. The vOAM VNF 50 is configured to uniquely identify the MEP associated with the OAM frame 64 based on the S-tag, the ingress interface, and the Maintenance Domain (MD) from the frame. The vOAM VNF 50 is configured to transmit an OAM frame 64 by i) adding an S-tag to the OAM frame 64 and ii) injecting the OAM frame 64 to the TAP interface for frame delivery out the associated physical port. The vOAM VNF 50 can perform frame encapsulation by adding an Ethernet frame header including the S-tag on the transmit side to allow the NOS 20 to forward the frames from the vOAM VNF 50 to a physical port untouched.

The NOS 20 is configured to receive an OAM frame 64 at the physical port and deliver the received OAM frame 64 to the associated TAP interface (based on the 1:1 mapping) with all service tags. The NOS 20 is configured to receive an OAM frame 64 at the TAP interface from the vOAM VNF 50 and to transmit the OAM frame 64 out the associated physical port.

Operators deploying the vOAM VNF 50 may need to monitor services on only a subset of physical ports in a device, i.e., not all the physical ports. In this case, services are configured only on that subset of physical ports. For example, for monitoring services on Network-Network Interface (NNI) ports at a (customer) endpoint device, down MEPs are required only on the NNI ports. For these cases, the NOS 20 can create TAP ports equal to the subset of physical ports on which service monitoring is required. This optimizes the number of resources used. In short, the NOS 20 can create TAP interfaces for physical ports on which service monitoring is required.

The NOS 20 can filter frames to/from the vOAM VNF 50 using the frame classification process 60. The frame classification process 60 can be a packet processor such as on a white box. For example, the frame classification process 60 can be configured to detect OAM frames 64 based on EtherType, Media Access Control (MAC) Destination Address (DA), etc. The frame classification process 60 can also provide more in-depth processing such as through Deep Packet Inspection (DPI). The objective here for the NOS 20 is to extract/siphon off the traffic that needs to be processed by the OAM service function and not send the entire line rate traffic through the vOAM VNF 50. On white box platforms with 100 Gb/s ports, it is not feasible nor practical to simply send multiple 100 Gb/s worth of traffic to a software service function.

On the injection side, to provide a simple and feasible mechanism can be restricted to a Down MEP, where an MEP (which is essentially an OAM "speaker") is associated with a given interface. With this in mind, it is easy to bind/associate the interface of the vOAM VNF 50 with an interface associated with the white/grey box.

Example Processing Device

Figure 4:
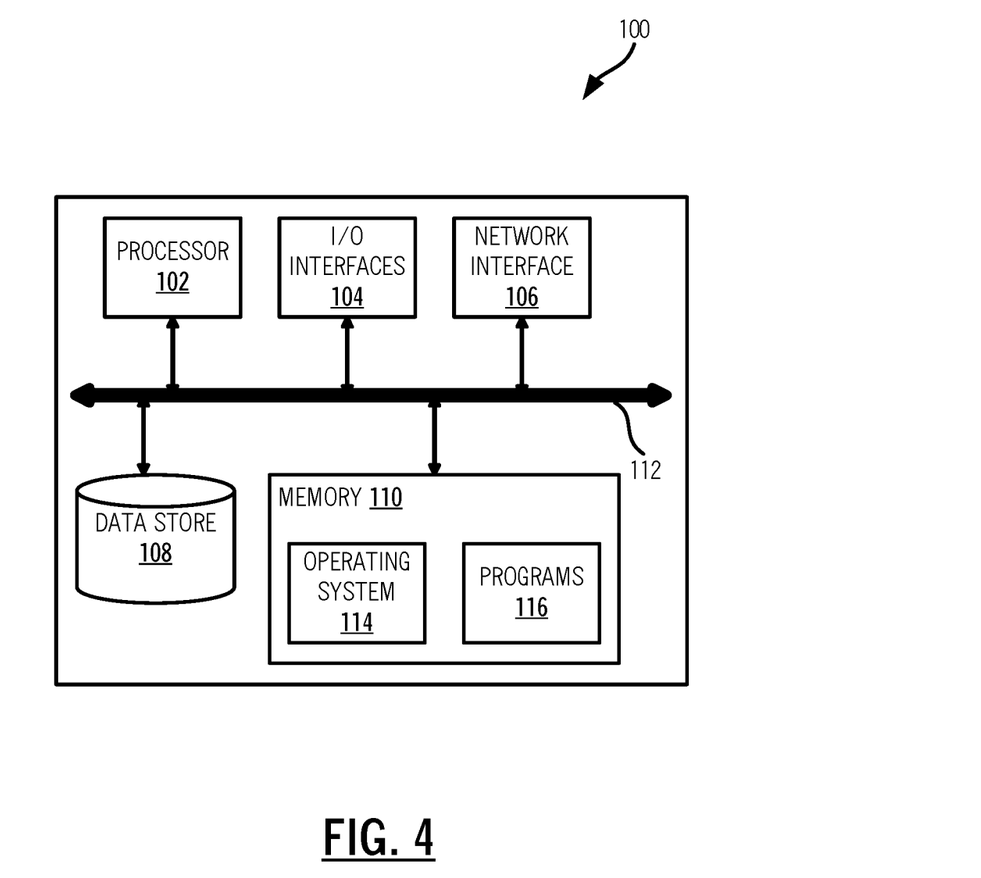
FIG. 4 is a block diagram of an example implementation of a processing device which can be used to realize the vOAM VNF.

FIG. 4 is a block diagram of an example implementation of a processing device 100 which can be used to realize the vOAM VNF 50. The processing device 100 can be a digital processing device that, in terms of hardware architecture and functionality, generally includes a processor 102, input/output (I/O) interfaces 104, a network interface 106, a data store 108, and memory 110. It should be appreciated by those of ordinary skill in the art that FIG. 4 depicts the processing device 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 can be, for example, but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 can include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the processing device 100, a semiconductor-based microprocessor (in the form of a microchip or chip set), or generally any device for executing software instructions. When the processing device 100 is in operation, the processor 102 is configured to execute software stored within the memory 110, to communicate data to and from the memory 110, and to generally control operations of the processing device 100 pursuant to the software instructions. The I/O interfaces 104 can be used to receive user input from and/or for providing system output to one or more devices or components. The network interface 106 can be used to enable the processing device 100 to communicate on a network.

The data store 108 can be used to store data. The data store 108 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 can incorporate electronic, magnetic, optical, and/or other types of storage media. The memory 110 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 can incorporate electronic, magnetic, optical, and/or other types of storage media. Note that the memory 110 can have a distributed architecture, where various components are situated remotely from one another, but can be accessed by the processor 102. The software in memory 110 can include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

In an embodiment, a VNF executed on the processing device 100 includes one or more first Terminal Access Point (TAP) interfaces which are virtual network kernel interfaces and which are each mapped to an associated second TAP interface associated with a Network Operating System (NOS) 20, wherein the associated second TAP interface is mapped to an associated physical port; and a processor 102 configured to receive, transmit, and process select frames 64 via the one or more first TAP interfaces, wherein the VNF 50 is in a sideline configuration of a service flow, only receiving and transmitting the select frames 64.

The NOS 20 is configured to deliver the select frames 64 from the associated physical port to the associated second TAP interface and to an associated first TAP interface with all service tags. The VNF can be the vOAM VNF 50 and the processor 102 can be further configured to uniquely identify a Maintenance End Point (MEP) associated with a select frame 64 based on a plurality of factors. The plurality of factors can include service tags, the associated physical port, and a Maintenance Domain (MD) from the select frame.

The processor 102 can be further configured to implement a logical interface for each of the one or more first TAP interfaces which indirectly maps the one or more first TAP interfaces with physical ports in the NOS 20. The NOS 20 can be configured to select the OAM frames 64 from data frames 62 in the service flow based on one or more of EtherType, OpCode, and Media Access Control (MAC) Destination Address (DA). The select frames can be compliant to one of IEEE 802.1ag, G.8013/Y.1731.

In another embodiment, a VNF system includes a sideline VNF executed on a processing device; and a Network Operating System (NOS) communicatively coupled to one or more VNFs and to the vOAM VNF; wherein a service flow is configured via the NOS through the one or more VNFs, wherein the service flow includes data frames and select frames, and wherein the NOS is configured to select only the select frames with the sideline VNF in a sideline configuration such that the sideline VNF only receives and transmits the select frames. The sideline VNF can include one or more first Terminal Access Point (TAP) interfaces which are virtual network kernel interfaces, and the NOS can include one or more second TAP interfaces which are 1:1 mapped with the one or more first TAP interfaces and one or more physical ports which are 1:1 mapped with the one or more second TAP interfaces.

Generalized Sideline Processing VNF

As described herein, the vOAM VNF 50 is one type of VNF that would directly benefit from these sideline processing techniques. Those skilled in the art would recognize the sideline configuration can apply to other classes of VNF. For example, the sideline configuration can be used in any VNF that contributes specific traffic to the data plane and needs to extract specific traffic from the data plane, i.e., any VNF that does not need to see all traffic in the service flow. Other examples of VNFs for the sideline configuration besides the vOAM VNF 50 can include control plane related VNFs (e.g., some routing protocol VNF), signaling plane related VNFs, and the like.

Figure 5:
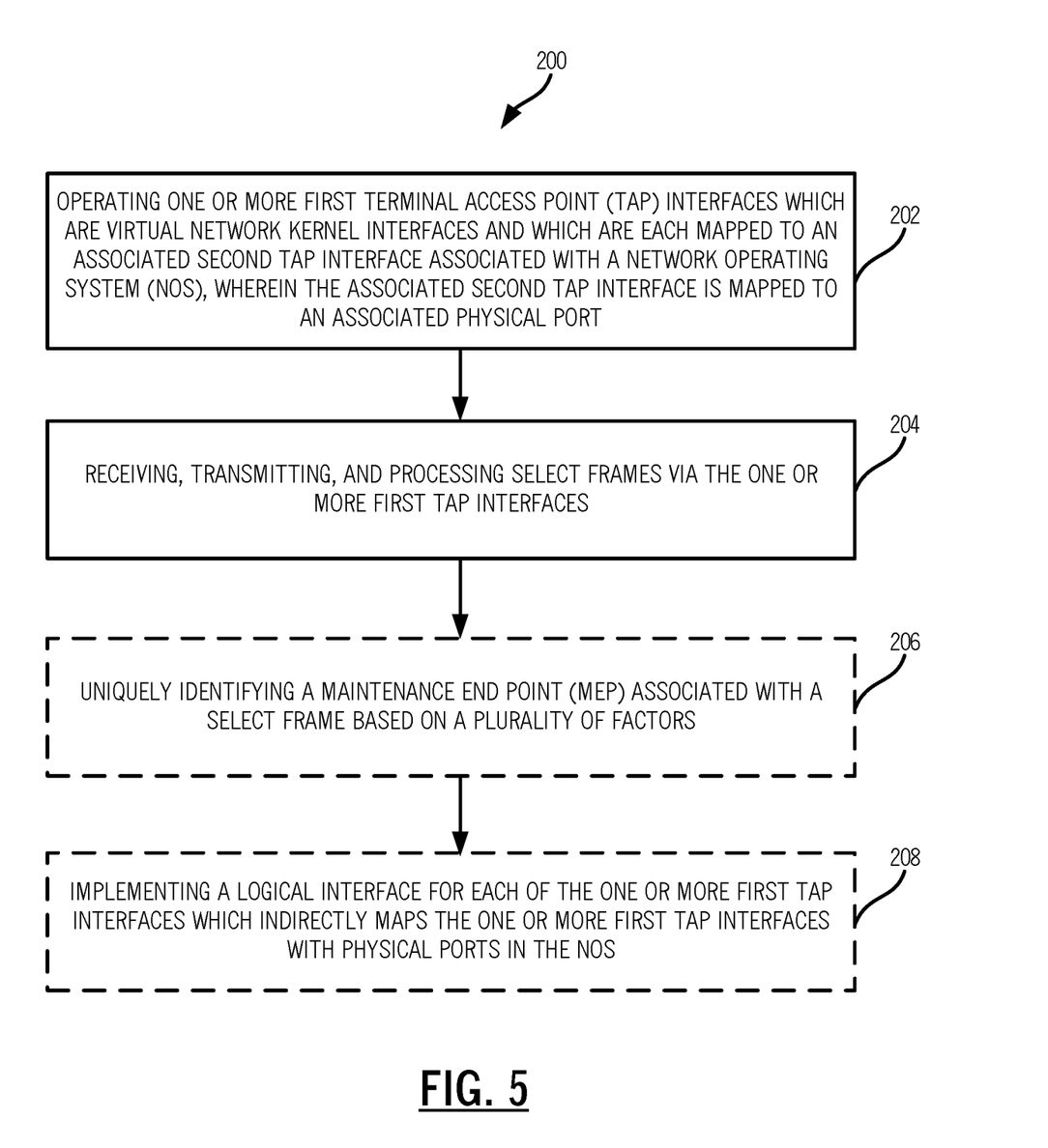
FIG. 5 is a flowchart of a virtualized Operations, Administration, and Maintenance (vOAM) process.

FIG. 5 is a flowchart of a VNF sideline configuration process 200. The process 200 includes operating one or more first Terminal Access Point (TAP) interfaces which are virtual network kernel interfaces and which are each mapped to an associated second TAP interface associated with a Network Operating System (NOS), wherein the associated second TAP interface is mapped to an associated physical port (step 202); and receiving, transmitting, and processing select frames via the one or more first TAP interfaces (step 204), wherein the VNF is in a sideline configuration of a service flow, only receiving and transmitting the select frames.

The process 200 can further include uniquely identifying a Maintenance End Point (MEP) associated with a select frame based on a plurality of factors (step 206). The plurality of factors can include service tags, the associated physical port, and a Maintenance Domain (MD) from the OAM frame. The process 200 can further include implementing a logical interface for each of the one or more first TAP interfaces which indirectly maps the one or more first TAP interfaces with physical ports in the NOS (step 208). The NOS can be configured to deliver the select frames from the associated physical port to the associated second TAP interface and to an associated first TAP interface with all service tags. The NOS can be configured to identify the select frames from data frames in the service flow based on one or more of EtherType, OpCode, and Media Access Control (MAC) Destination Address (DA).

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Virtual Network Function (VNF) system comprising:
a VNF executed on a processing device, the VNF comprising one or more first Terminal Access Point (TAP) interfaces which are virtual network kernel interfaces and which are each mapped to an associated second TAP interface associated with a Network Operating System (NOS) executed on network hardware, wherein the associated second TAP interface is mapped to an associated physical port; and
the processing device comprising a processor configured to receive, transmit, and process select frames via the one or more first TAP interfaces,
wherein the VNF is in a sideline configuration of a service flow and is launched without being a part of any service flows, such that the VNF is outside of the service flow and only receives and transmits frames of the service flow classified by the NOS as the select frames, wherein the VNF is a virtualized Operations, Administration, and Maintenance (vOAM) VNF, and wherein the processor is further configured to uniquely identify a Maintenance End Point (MEP) associated with an OAM frame based on a plurality of factors.

2. The VNF of claim 1, wherein the NOS is configured to send the select frames from the associated physical port to the associated second TAP interface and to an associated first TAP interface with all service tags.

3. The VNF of claim 1, wherein the plurality of factors comprise service tags, the associated physical port, and a Maintenance Domain (MD) from the select frame.

4. The VNF of claim 1, wherein the processor is further configured to implement a logical interface for each of the one or more first TAP interfaces which indirectly maps the one or more first TAP interfaces with physical ports.

5. The VNF of claim 1, wherein the NOS is configured to select the select frames from data frames in the service flow based on one or more of EtherType, OpCode, and Media Access Control (MAC) Destination Address (DA).

6. The VNF of claim 1, wherein the select frames are compliant to one of IEEE 802.1ag and G.8013/Y.1731.

7. A Virtual Network Function (VNF) system comprising:
a sideline VNF executed on a processing device; and
a Network Operating System (NOS) communicatively coupled to one or more VNFs and to the sideline VNF, wherein the NOS is executed on network hardware;
wherein a service flow is configured via the NOS through the one or more VNFs, wherein the service flow comprises data frames and select frames, and wherein the NOS is configured to select only the select frames with the sideline VNF in a sideline configuration and is launched without being a part of any service flows, such that the sideline VNF is outside of the service flow and only receives and transmits frames of the service flow classified by the NOS as the select frames, wherein the sideline VNF is a virtualized Operations, Administration, and Maintenance (vOAM) VNF, and wherein a Maintenance End Point (MEP) associated with an OAM frame is uniquely identified based on a plurality of factors.

8. The VNF system of claim 7, wherein the sideline VNF comprises one or more first Terminal Access Point (TAP) interfaces which are virtual network kernel interfaces,
wherein the network hardware comprises one or more second TAP interfaces which are 1:1 mapped with the one or more first TAP interfaces and one or more physical ports which are 1:1 mapped with the one or more second TAP interfaces.

9. The VNF system of claim 7, wherein the NOS is configured to send the select frames from an associated physical port to the sideline VNF via associated Terminal Access Point (TAP) interfaces with all service tags.

10. The VNF system of claim 7, wherein the plurality of factors comprise service tags, the associated physical port, and a Maintenance Domain (MD) from the OAM frame.

11. The VNF system of claim 7, wherein the NOS is configured to select the OAM frames from data frames in the service flow based on one or more of EtherType, OpCode, and Media Access Control (MAC) Destination Address (DA).

12. The VNF system of claim 7, wherein the OAM frames are compliant to one of IEEE 802.1ag and G.8013/Y.1731.

13. A Virtual Network Function (VNF) method comprising:
   operating one or more first Terminal Access Point (TAP) interfaces which are virtual network kernel interfaces and which are each mapped to an associated second TAP interface associated with a Network Operating System (NOS), wherein the associated second TAP interface is mapped to an associated physical port;
   receiving, transmitting, and processing select frames via the one or more first TAP interfaces; and
   uniquely identifying a Maintenance End Point (MEP) associated with the select frame based on a plurality of factors,
   wherein the VNF is in a sideline configuration of a service flow and is launched without being a part of any service flows, such that the VNF is outside of the service flow and only receives and transmits frames of the service flow classified by the NOS as the select frames.

14. The VNF method of claim 13, wherein the NOS is configured to send the select frames from the associated physical port to the associated second TAP interface and to an associated first TAP interface with all service tags.

15. The VNF method of claim 13, wherein the plurality of factors comprise service tags, the associated physical port, and a Maintenance Domain (MD) from the OAM frame.

16. The VNF method of claim 13, further comprising:
   implementing a logical interface for each of the one or more first TAP interfaces which indirectly maps the one or more first TAP interfaces with physical ports.

17. The VNF method of claim 13, wherein the NOS is configured to select the select frames from data frames in the service flow based on one or more of EtherType, OpCode, and Media Access Control (MAC) Destination Address (DA).

* * * * *